United States Patent [19]

Gjertsen

[11] Patent Number: 4,692,304
[45] Date of Patent: Sep. 8, 1987

[54] REMOVABLE AND REUSABLE LOCKING PIN FOR TOP NOZZLE ASSEMBLY AND DISASSEMBLY

[75] Inventor: Robert K. Gjertsen, Monroeville Boro, Pa.

[73] Assignee: Westinghouse Electric Corp., Pittsburgh, Pa.

[21] Appl. No.: 812,041

[22] Filed: Dec. 23, 1985

[51] Int. Cl.$^4$ .............................................. G21C 3/32
[52] U.S. Cl. .................................... 376/446; 376/463
[58] Field of Search ............... 376/446, 440, 449, 353, 376/264, 463; 403/21, 22, 407.1

[56] References Cited

U.S. PATENT DOCUMENTS

| | | | |
|---|---|---|---|
| 3,770,583 | 11/1973 | Klumb | 376/446 |
| 3,814,667 | 6/1974 | Klumb | 376/446 |
| 4,269,661 | 5/1981 | Kmonk | 376/446 |
| 4,563,328 | 1/1986 | Steinke | 376/446 |
| 4,603,027 | 7/1986 | Wilson | 376/446 |
| 4,617,171 | 10/1986 | Feutrel | 376/446 |
| 4,618,472 | 10/1986 | Gjertsen | 376/446 |

*Primary Examiner*—Donald P. Walsh

[57] ABSTRACT

A reconstitutable fuel assembly has a top nozzle which not only can be readily removed from and replaced back on the fuel assembly as a unitary subassembly, but also can be readily disassembled and reassembled itself in order to repair or replace some of its own components. The top nozzle uses a plurality of reusable locking pins releasably mounted in bores defined in the sidewall of the top nozzle lower adapter plate. The locking pins, in being mounted in the bores, extend across slots formed in the sidewall and, in so doing, close the open upper ends of slots so as to prevent upward movement of elements on the upper hold-down plate lugs out of the slots and thereby prevent disassembly of the upper hold-down plate from the lower adapter plate. In particular, the locking pins have radially flexible end tangs which are actuatable from a normally expanded position for preventing withdrawal of the locking pins from the sidewall bores to collapsed positions for allowing withdrawal and reinsertion of the locking pins from and into the bores. A knockout tool with a tapered end cavity is used to flex the tangs to their collapsed positions for withdrawal. The tool has a cross-sectional size smaller than that of the sidewall bore allowing it to be inserted into the bores during removal of the locking pins. The outer heads of the tangs are tapered or beveled which causes the tangs to flex radially inward to their collapsed position when the locking pins are being reinserted tang end first into the bores.

13 Claims, 9 Drawing Figures

FIG. 9

REMOVABLE AND REUSABLE LOCKING PIN FOR TOP NOZZLE ASSEMBLY AND DISASSEMBLY

CROSS REFERENCES TO RELATED APPLICATIONS

Reference is hereby made to the following copending applications dealing with related subject matter and assigned to the assignee of the present invention:

1. "Reconstitutable Nuclear Reactor Fuel Assembly With Unitary Removable Top Nozzle Subassembly" by John M. Shallenberger, assigned U.S. Ser. No. 673,681 and filed Nov. 20, 1984, a continuation-in-part of copending U.S. patent application Ser. No. 457,790 filed Jan. 13, 1983 (W.E. 50,419I).

2. "Improved Removable Top Nozzle Subassembly For A Reconstitutable Nuclear Fuel Assembly" by John F. Wilson et al, assigned U.S. Ser. No. 701,049 and filed Feb. 12, 1985 (W.E. 52,457).

3. "Device And Method For Unfastening And Lifting A Top Nozzle Subassembly From A Reconstitutable Fuel Assembly" by John F. Wilson et al, assigned U.S. Ser. No. 720,208 and filed Apr. 4, 1985 (W.E. 52,519).

4. "Integral Reusable Locking Arrangement For A Removable Top Nozzle Subassembly Of A Reconstitutable Nuclear Fuel Assembly" by Robert K. Gjertsen et al, assigned U.S. Ser. No. 775,208 and filed 9/12/85 (W.E. 52,631).

5. "Top Nozzle Adapter Plate With Fuel Rod Capture Grid Having Pressure Drop Adjusting Means" by Robert K. Gjertsen et al, assigned U.S. Ser. No. 752,272 and filed 7/5/85 (W.E. 52,725).

BACKGROUND OF THE INVENTION

1. Field of the Invention

The present invention relates generally to reconstitutable fuel assemblies for nuclear reactors and, more particularly, is concerned with a removable and reusable locking pin for permitting assembly and disassembly of upper holddown and lower adapter plates of a removable top nozzle subassembly of a reconstitutable fuel assembly.

2. Description of the Prior Art

Conventional designs of fuel assemblies include a multiplicity of fuel rods held in an organized array by grids spaced along the fuel assembly length. The grids are attached to a plurality of control rod guide thimbles. Top and bottom nozzles on opposite ends of the fuel assembly are secured to the control rod guide thimbles which extend above and below the opposite ends of the fuel rods. At the top end of the fuel assembly, the guide thimbles are attached in openings provided in the top nozzle. Conventional fuel assemblies also have employed a fuel assembly hold-down device to prevent the force of the upward coolant flow from lifting a fuel assembly into damaging contact with the upper core support plate of the reactor, while allowing for changes in fuel assembly length due to core induced thermal expansion and the like. Such hold-down devices have included the use of springs surrounding the guide thimbles, such as seen in U.S. Pat. Nos. 3,770,583 and 3,814,667 to Klumb et al and 4,269,661 to Kmonk et al, and in the first patent application cross-referenced above.

Due to occasional failure of some fuel rods during normal reactor operation and in view of the high costs associated with replacing fuel assemblies containing failed fuel rods, the trend is currently toward making fuel assemblies reconstitutable in order to minimize operating and maintenance expenses. Conventional reconstitutable fuel assemblies incorporate design features arranged to permit the removal and replacement of individual failed fuel rods. Reconstitution has been made possible by providing a fuel assembly with a removable top nozzle. The top nozzle is mechanically fastened usually by a threaded arrangement to the upper end of each control rod guide thimble, and the top nozzle can be removed remotely from an irradiated fuel assembly while it is still submerged in a neutron-absorbing liquid. Once removal and replacement of the failed fuel rods have been carried out on the irradiated fuel assembly submerged at a work station and after the top nozzle has been remounted on the guide thimbles of the fuel assembly, the reconstituted assembly can then be reinserted into the reactor core and used until the end of its useful life.

One recently proposed design for a reconstitutable fuel assembly top nozzle is described and illustrated in the second patent application cross-reference above. The proposed top nozzle overcomes certain problems associated with the removable top nozzle designs of the above-cited U.S. patents and patent application. Specifically, it includes improved structures which eliminate relative moving contact or sliding engagement between the upper core support plate and the hold-down structure of the top nozzle while providing removable mounting of the top nozzle as a unitary subassembly on the guide thimbles of the reconstitutable fuel assembly as well as desired alignment of the fuel assembly with the upper core plate. Relative motion between the upper core plate and alignment sleeves of the top nozzle still takes place but without damaging contact with one another. Also, any deleterious effects on the hold-down springs from coolant cross-flow between fuel assemblies are substantially eliminated in the proposed top nozzle by the incorporation of an enclosure wall about the perimeter of the top nozzle which protects the springs from flow induced vibration.

The proposed top nozzle includes an upper hold-down plate which compresses a plurality of hold-down springs, preferably four in number, against a lower adapter plate. Lugs associated with the upper hold-down plate and the enclosure associated with the lower adapter plate are slidable coupled together via locking shear pins which restrict their relative movement away from each other but allow movement toward each other. Elongated alignment sleeves at their upper ends extend through passageways in the upper hold-down plate and at their lower ends are releasably threaded to the upper ends of the guide thimbles which extend upwardly through holes in the lower adapter plate. In such arrangement, when the lower ends of the alignment sleeves are tightened against the adapter plate, they cooperate with lower retainers on the guide thimbles below the adapter plate to mount the top nozzle via the adapter plate on the guide thimbles. Conversely, for removal of the top nozzle, the alignment sleeves are unthreaded from the guide thimbles. The sleeves remain captured between the upper hold-down and lower adapter plates, as also do the respective hold-down springs which encompass the sleeves, after the sleeves are threadably disconnected from the guide thimbles and the top nozzle is removed as a unitary subassembly from the fuel assembly.

While the proposed removable top nozzle design of the second cross-referenced patent application, as just briefly described, has proven to be a highly satisfactory solution to the problems previously existing and permits assembly and disassembly of the top nozzle as a unit upon and from the guide thimbles of the fuel assembly, it makes no provision for disassembly of the top nozzle itself. During initial fabrication and later during reconstitution of the fuel assembly, it would be advantageous to be able to disassemble the top nozzle to allow access to the hold-down springs and the alignment sleeves in the event that replacement of one or more of these components is required. As briefly mentioned above, the upper hold-down and lower adapter plates of the top nozzle are slidably connected together by four locking shear pins. These shear pins are generally welded in place and are only considered to be removable in the limited sense that in the process of forceable removal they are ordinarily destroyed. Also, some damage will likely be incurred by the lower adapter plate enclosure to which these shear pins were welded, which must be repaired before new shear pins can be installed.

Consequently, a need exists for a different approach to locking the upper hold-down plate and lower adapter plate of the top nozzle in their slidable connection, one which will allow relatively easy disconnecting or disassembling of the respective top nozzle plates while reliably maintaining the plates in their slidable connection when assembled together.

SUMMARY OF THE INVENTION

The present invention provides a removable and reusable locking pin designed to satisfy the aforementioned needs. The pin is shearable as was the case heretofore but now incorporates a locking feature on an end thereof. The locking feature is preferably in the form of a plurality of elastically flexible tangs which are deflectible radially inwardly toward one another to a collapsed position which permits insertion and withdrawal of the pin into and from a locking position through a bore in a wall portion of the lower adapter plate enclosure. When the tangs are released, they automatically spring back outwardly to a normal expanded position in which their tips extend beyond the peripheral edge of the bore so as to prevent withdrawal of the pin from the bore. Use of a knockout tool is required to cause sufficient inward flexing of the tangs to remove the locking pin. Thus, it is unlikely that the locking pin can be removed accidentally. Further, since the tangs are designed to repeatedly work within the elastic range of the materials composing the locking pin, the locking pin is reusable after removal.

Accordingly, the present invention is directed to a fuel assembly top nozzle in which the combination comprises: (a) a lower adapter plate; (b) an upper hold-down plate; (c) resilient means disposed between the lower and upper plates so as to bias the plates to move away form one another, but being yieldable so as to permit the plates to move toward one another; (d) a first structure mounted on the lower plate and extending toward the upper plate; (e) a second structure mounted on the upper plate and extending toward the lower plate and along the first structure; (f) means defining at least one slot in one of the first and second structures so as to extend toward the lower and upper plates; (g) at least one protruding element attached on the other of the first and second structures and extending into the slot, the protruding element being slidably moved along the slot as the lower and upper plates move toward and away from one another; and (h) closure means mounted to the one of the first and second structures containing the slot, the closure means defining an end of the slot so as to limit the extent of movement of the protruding element along the slot in a direction in which the plates move away from each other and thereby prevent disassembly of the lower and upper plates from one another, the closure means being releasable and reusable for permitting opening of the slot end for facilitating disassembly of the plates from one another and then reassembly of the plates back together.

More particularly, the one of the structures containing the slot has a bore defined therein which intersects with the end of the slot. Also, the closure means is a removable and reusable locking pin being mounted in the bore so as to extend across the slot and close the end thereof. The locking pin has flexible means being actuatable for releasing and removing the locking pin from the bore and thereby opening the end of the slot.

Specifically, the locking pin has an elongated body with a cross-sectional size smaller than that of the bore adapting the body to be received through the bore. An enlarged head attached on one end of the body and having a size larger than that of the bore adapts the head to limit insertion of the body through the bore. At least one radially flexible locking element extends from the opposite end of the body. The locking element is actuatable between an expanded position for preventing withdrawal of the body from the bore and a collapsed position for allowing withdrawal and reinsertion of the body from and into the bore. Preferably, there are multiple locking elements in the form of a plurality of circumferentially spaced radially flexible tangs extending axially from the end of the body. Each tang includes a radially flexible leg, and an outer head on the leg having an outer lateral tip being extended beyond the circumference of the bore when the tang is in the expanded position and retracted within the circumference of the bore when the tang is in the collapsed position. The outer head of the tang has a beveled configuration adapting it to cause inward radial flexing of the leg upon contacting the structure for reinsertion of the pin into the bore.

The present invention also relates to a method of installing and removing the locking pin having the radially flexible tangs with beveled heads into and from the bore in the sidewall of the fuel assembly top nozzle. In removing the locking pin, the beveled heads on the tangs of the pin are engaged by an end of a tool having a tapered cavity which matches the beveled configuration of the heads. By forcibly driving the tool toward the pin, the tangs are flexed, allowing withdrawal of the pin from the bore.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

In the following description, like reference characters designate like or corresponding parts throughout the several views of the drawings. Also in the following description, it is to be understood that such terms as "forward", "rearward", "left", "right", "upwardly", "downwardly", and the like are words of convenience and are not be construed as limiting terms.

IN GENERAL

Figure 1:
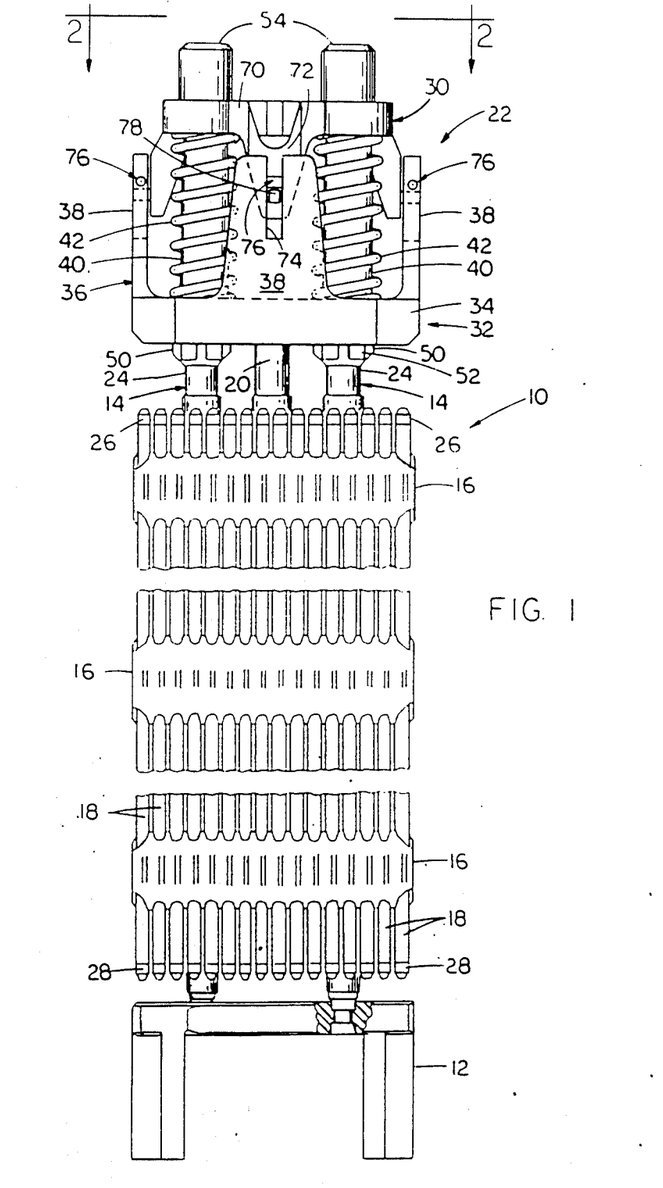
FIG. 1 is an elevational view, with parts broken away for clarity, of a reconstitutable fuel assembly having a removable top nozzle using reusable and removable locking pins in accordance with the principles of the present invention.

Referring now to the drawings, and particularly to FIG. 1, there is shown an elevational view of a reconstitutable nuclear reactor fuel assembly, represented in vertically foreshortened form and being generally designated by the numeral 10. Basically, the fuel assembly 10 includes a lower end structure or bottom nozzle 12 for supporting the assembly on the lower core plate (not shown), in the core region of a reactor (not shown), and a number of longitudinally extending guide tubes or thimbles 14 which project upwardly from the bottom nozzle 12. The assembly 10 further includes a plurality of transverse grids 16 axially spaced along the guide thimbles 14 and an organized array of elongated fuel rods 18 transversely spaced and supported by the grids 16. Also, the assembly 10 has an instrumentation tube 20 located in the center thereof and an upper end structure or top nozzle 22 attached to the upper end portions 24 of the guide thimbles 14. With such arrangement of parts, the fuel assembly 10 forms an integral unit capable of being conventionally handled without damaging the assembly parts.

As mentioned above, the fuel rods 18 in the array thereof in the assembly 10 are held in spaced relationship with one another by the grids 16 spaced along the fuel assembly length. Each fuel rod 18 includes nuclear fuel pellets (not shown) and is closed at its opposite ends by upper and lower end plugs 26,28. The fuel pellets composed of fissile material are responsible for creating the reactive power of the reactor. A liquid moderator-coolant such as water, or water containing boron, is pumped upwardly through the guide thimbles 14 and along the fuel rods 18 of the fuel assembly 10 in order to extract heat generated therein for the production of useful work.

To control the fission process, a number of control rods (not shown) are reciprocally movable in the guide thimbles 14 located at predetermined positions in the fuel assembly 10. Since the control rods are inserted into the guide thimbles 14 from the top of the fuel assembly 10, the placement of the components forming the top nozzle 22 and their attachment to the upper end portions 24 of the guide thimbles 14 must accommodate the movement of the control rods into the guide thimbles 14 from above the top nozzle 22.

TOP NOZZLE REMOVABLY MOUNTED ON GUIDE THIMBLES

Figure 2:
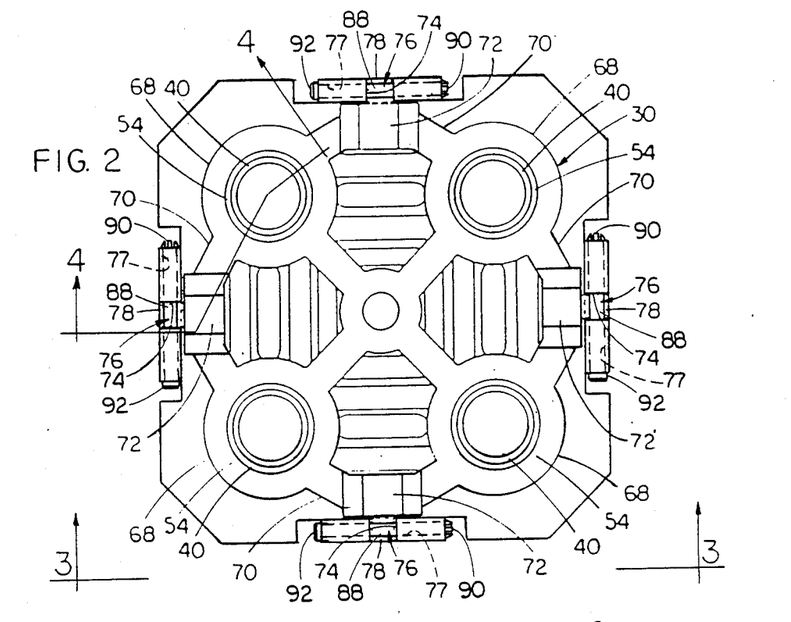
FIG. 2 is an enlarged top plan view of the reconstitutable fuel assembly as seen along line 2—2 of FIG. 1, showing the removable top nozzle incorporating the removable and reusable locking pins of the present invention.
Figure 3:
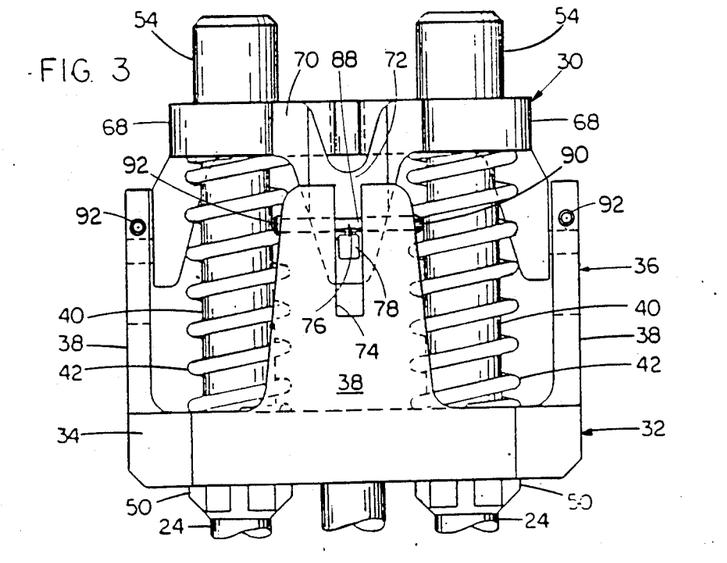
FIG. 3 is an elevational view of the removable top nozzle as seen along line 3—3 of FIG. 2.

Turning now to FIGS. 2 and 3, as well as FIG. 1, there is shown in greater detail the separate components making up the top nozzle 22 which is mounted on the upper end portions 24 of the guide thimbles 14 of the fuel assembly 10 for removel and replacement as a unitary subassembly. The top nozzle 22 basically includes an upper hold-down plate 30, an enclosure 32 having a lower adapter plate 34 and an upstanding discontinuous sidewall 36 formed by a plurality of spaced upstanding wall portions 38 surrounding and attached to the periphery of the adapter plate, a plurality of tubular alignment sleeves 40 disposed between the upper and lower plates 30,34 and a plurality of hold-down coil springs 42 extending between the uper and lower plates 30,34 and about the respective sleeves 40. The upper hold-down plate 30 has a plurality of passageways 44 defined therethrough, while the lower adapter plate has a plurality of openings 46, the passageways 44 and openings 46 being arranged in respective patterns which are matched to that of the guide thimbles 14 of the fuel assembly 10.

More particularly, the upper end portions 24 of the guide thimbles 14 extend upwardly through the openings 46 in the lower adapter plate 34, and above the upper surface 48 thereof. A plurality of lower retainers 50 are attached, such as by brazing, to the guide thimbles 14 below the lower adapter plate 34 for limiting downward slidable movement of the adapter plate 34 relative to the guide thimbles 14 and thereby supporting the adapter plate on the guide thimbles with the upper end portions 24 thereof extending above the adapter plate. Each lower retainer 50 on one guide thimble 14 has a series of scallops 52 formed on its periphery which are aligned with those of the fuel rods 18 grouped about the respective one guide thimble so that the fuel rods may be removed and replaced during reconstitution of the fuel assembly 10.

Figure 4:
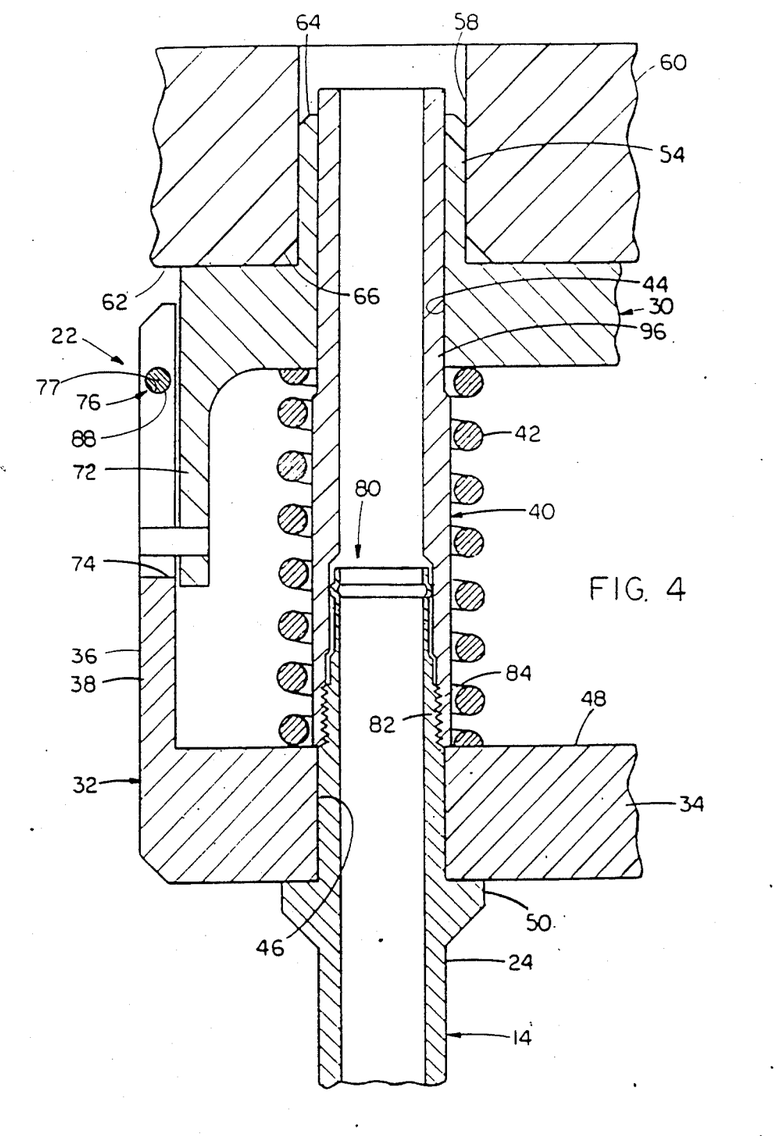
FIG. 4 is an enlarged fragmentary sectional view of the top nozzle on an upper end of one guide thimble of the fuel assembly as taken along line 4—4 of FIG. 2, showing one of the locking pins being disposed through a bore in one wall portion of the lower adapter plate enclosure of the removable top nozzle.

Furthermore, the top nozzle 22 includes a plurality of upstanding bosses 54 having respective central bores 56 defined therethrough. The bosses 54 are disposed above the upper hold-down plate 30, and each boss is attached to the hold-down plate 30 such that its central bore 56 is aligned with a respective one of the passageways 44 of the hold-down plate. Additionally, each boss 54 is of a cross-sectional size adapted to interfit within one of a plurality of holes 58 (only one of which is seen in FIG. 4) formed in the upper core plate 60 which opens at a lower side 62 of the core plate. The upper circumferential edge 64 of each boss 54 is chamfered for mating with a complementary chamfered edge 66 on the lower side 62 of the upper core plate 60 at the entrance to each of the holes 58 defined therein. Edges having such shapes act as guiding surfaces which facilitate alignment and insertion of the respective bosses 54 into the corresponding holes 58 in the upper core plate 60 during installation of the fuel assembly 10 within the reactor core.

As mentioned above, the hold-down coil springs 42 are disposed about the respective elongated alignment sleeves 40 within the enclosure 32. Further, the springs 42 extend between the lower adapter plate 34 and the upper hold-down plate 30 and support the upper plate in a spaced relation above the lower plate at a stationary position in which the upper plate abuts the lower side 62 of the upper core plate 60 with the upstanding bosses 54 interfitted within the holes 58 of the upper core plate 60. Also, the upper hold-down plate 30 is composed of an array of hubs 68 and ligaments 70 which extend between and interconnect the hubs. Each of the hubs 68 has one of the passageways 44 defined therethrough. Furthermore, one boss 54 is disposed above and connected to each of the hubs 68 with the bore 56 of the boss aligned with the respective passageway 44 of the hub.

Referring to FIGS. 2 to 4, the top nozzle 22 includes means interconnecting the spaced upper and lower plates 30, 34 so as to accommodate movement of the lower plate 34 toward and away from the upper plate 30 upon axial movement of the guide thimbles 14 of the fuel assembly 10, such as due to thermal growth, toward and away from the upper core plate 60. Also, the interconnecting means is effective to limit movement of the lower adapter plate 34 away from the upper hold-down plate 30 so as to maintain the springs 42 in a state of compression therebetween. In particular, the interconnecting means includes a plurality of lugs 72 connected to and extending downwardly from peripheral ones of the ligaments 70. The lugs 72 are respectively coupled to the upstanding wall portions 38 of the discontinuous sidewall 36 of the enclosure 32. Specifically, a generally vertical slot 74 is formed in each wall portion 38, being closed at its lower end and open at its upper end at the edge of the wall portion 38. In accordance with the present invention, an improved removable and reusable locking pin 76, which will be described below in greater detail, is inserted horizontally into a bore 77 (interrupted by the vertical slot 74) formed in the upper end of each wall portion 38. The locking pin 76 in bridging the slot 74 serves to close the open upper end of the slot. A pin 78 mounted in the lower end of each lug 72 extends into the slot 74 below the improved locking pin 76 for slidable movement therealong as the upper and lower plates 30, 34 move relative to one another. In such arrangement, the improved locking pin 76 and the lower end of the slot 74 respectively define the limits of movement of the lower adapter plate 34 toward and away from the upper hold-down plate 30.

Referring to FIG. 4, there is shown one of the elongated tubular alignment sleeves 40 extending through one of the hold-down springs 42 between the upper and lower plates 30, 34 and the threaded features on the sleeve 40 and on the upper end portion 24 of the one guide thimble 14 for attaching the sleeve and guide thimble together. Also illustrated in the figure is the reusable locking arrangement, generally designated as 80, integrally associated with both the sleeve 40 and the guide thimble upper end portion 24 for locking the attached sleeve and guide thimble together. Since a description of the details of the reusable locking arrangement 80 is not necessary for understanding the improved locking pin 76 of the present invention, it will not be presented herein. Such arrangement comprises the invention disclosed and illustrated in the fourth patent application cross-referenced above.

With respect to the threaded features on the guide thimble 14 and sleeve 40, the upper end portion 24 of the guide thimble 14 has an annular externally threaded section 82, whereas the tubular alignment sleeve 40 has a lower annular internally threaded section 84. The sleeve 40 is mounted through the passageway 44 and bore 56 of the hold-down plate hub 68 and boss 54 for rotatable and vertical axial movement relative to the guide thimble upper end portion 24 for threading and unthreading its internally threaded section 84 onto and from the externally threaded section 82 of the guide thimble upper end portion 24 in order to attach and detach the top nozzle 22 onto and from the guide thimble 14. The sleeve 40 is hollow so that, in addition to accommodating insertion of a control rod through it, a suitable tool (not shown) can be inserted into the sleeve for gripping it internally to rotate it in either direction for threading on and unthreading from the upper end portion 24 of the guide thimble 14. When threaded on the guide thimble upper end portion 24, the sleeve 40 cooperates with the lower retainer 50 to clamp the adapter plate 34 therebetween.

REMOVABLE AND REUSABLE LOCKING PINS

Referring again to FIGS. 2 to 4, it will be readily understood that the improved locking pin 76, like the prior locking pin it replaces, will maintain the upper hold-down plate 30 and lower adapter plate 34 of the top nozzle in a slidably connected relationship such that by unthreading the alignment sleeves 40 from the guide thimble upper end portions 24, the top nozzle 22 can be removed as a unitary subassembly from the reconstitutable fuel assembly 10. However, unlike the prior locking pin which was welded in place, the improved locking pin is readily releasable or removable from the bore 77 in a manner which allows it to be reused. Therefore, unlike before, the top nozzle subassembly 22 itself can now be readily disassembled in order to repair or replace any of its components.

Figures 7, 8:
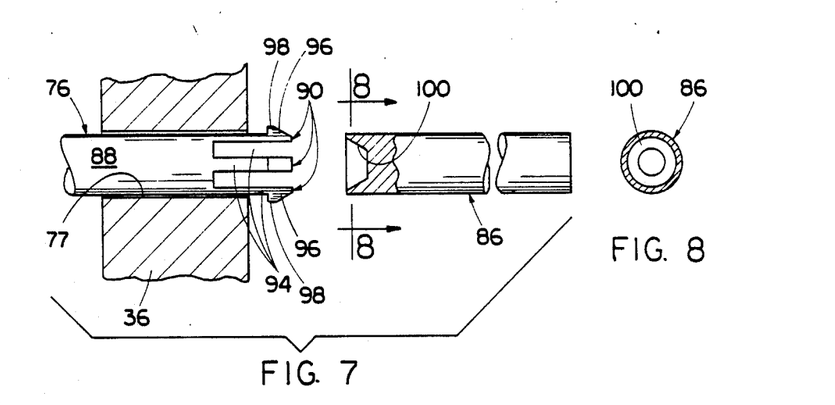
FIG. 7 is a sectional view of a knockout tool adapted to be used to remove the locking pin from the bore of the enclosure wall portion, a part of which is also being partially depicted in sectional form.
FIG. 8 is a sectional view of the knockout tool as taken along line 8—8 of FIG. 7.
Figure 9:
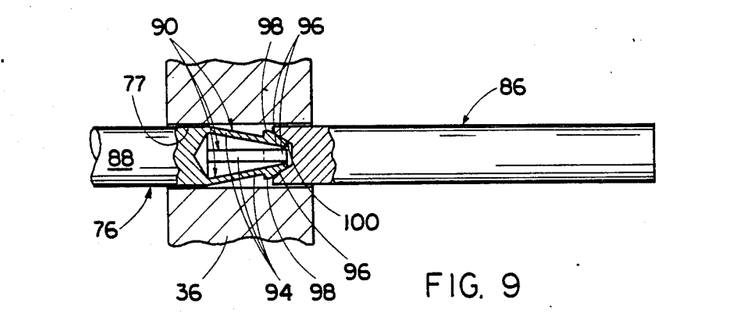
FIG. 9 is another sectional view similar to that of FIG. 7, but showing the knockout tool mated with the tangs on the end of the locking pin and retaining them in their collapsed position in which they permit removal of the locking pin from the enclosure wall portion bore.

Turning to FIGS. 5 to 9, there is shown the preferred embodiment of the improved removable and reusable locking pin 76 and, in FIGS. 7 to 9, a knockout tool, generally designated 86, which is used to remove the improved locking pin. The top nozzle uses a plurality of the reusable locking pins 76, each being releasably mounted in one of a plurality of the bores 77 defined in the respective wall portions 38 of the sidewall enclosure 32. The locking pin 76, in being mounted in the bore 77, extends across the slot 74 formed in the enclosure sidewall and, in so doing, closes the open upper end of slot so as to prevent movement of the pin 78 on each upper hold-down plate lug 72 upwardly out of the slot. In such manner, slidable movement of the pin 78 is limited and thereby disassembly of upper hold-down plate 30 from the lower adapter plate 34 is prevented.

Figures 5, 6:
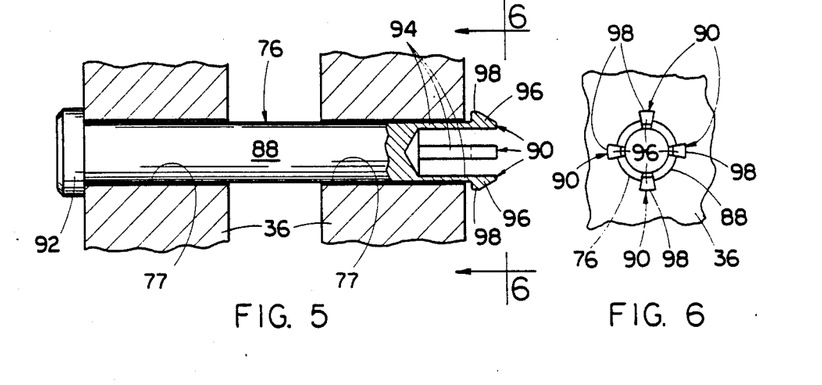
FIG. 5 is an enlarged sectional view of a fragmentary part of the enclosure wall portion of the removable top nozzle adapter plate in the fuel assembly of FIG. 1, showing the reusable and removable locking pin of the present invention being inserted in a locking position through the bore of the wall portion with the tangs on an end of the locking pin disposed in their expanded position.
FIG. 6 is a plan view of the tang-bearing end of the locking pin as seen along line 6—6 of FIG. 5.

More particularly, each of the locking pins 76 includes an elongated cylindrical body 88 of a constant diameter which is smaller than that of the bore 77 and a plurality of circumferentially spaced radially flexible barbs or tangs 90 extending axially from an end of the body 88. An enlarged head 92 having a diameter larger than that of the bore 77 is fixed on the opposite end of the body 88 and will contact the wall portion 38 surrounding the bore 77 when the improved pin 76 is fully inserted.

Each of the tangs 90 includes a radially flexible leg 94 and an outer head 96 on the leg having an outer lateral tip 98. The flexible tangs 90 are actuatable from a normally expanded position, as seen in FIG. 5, in which the outer tips 98 of the tangs 90 extend beyond the circumference of the enclosure sidewall bore 77 for preventing withdrawal of the locking pin 76 from the bore, to a collapsed position, as seen in FIG. 9, in which the outer tips 98 of the tangs 90 are retracted to within the perimeter of the bore 77 for allowing withdrawal and reinsertion of the locking pin from and into the bore. Thus, when the improved locking pin 76 is fully inserted in the bore 77 as shown in FIG. 5, the outer barbed tips 98 of the tangs 90 spring outwardly to their normal position. In this position, a physical interference exists between the tang tips 98 and the wall portion 38 surrounding the bore 77 thereby prevent pin removal.

As seen in FIGS. 7 to 9, the knockout tool 86 is required to remove the improved pin 76. The tool 86 has a tapered end cavity 100 which receives the outer heads 96 on the ends of the tangs 90 and upon being impacted at its end opposite the cavity will forcibly flex the tangs to their collapsed position for withdrawal through the bore 77. The tool 86 has a cross-sectional size less than that of the bore 77 allowing it to be inserted into the bore 77 during removal of the improved locking pin 76.

The outer heads 96 of the tangs 90 are tapered or beveled (to provide the barbed configuration) which causes the legs 94 of the tangs to flex radially inward to the collapsed position of the tangs upon contacting the wall portion 38 around the bore 77 when the improved locking pin 76 is being reinserted tang end first into the bore. Since the tangs 90 are designed to work within the elastic range of the material composing them, they are reusable after removal. When all four of the improved locking pins 76 have been removed, the upper holddown plate 30 is free to be lifted from the lower adapter plate 34 of the top nozzle 22.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

I claim:

1. In fuel assembly top nozzle, the combination comprising:
    (a) a lower adapter plate;
    (b) an upper hold-down plate;
    (c) resilient means disposed between said lower and upper plates so as to bias said plates to move away from one another, but being yieldable so as to permit said plates to move toward one another;
    (d) a first structure mounted on said lower plate and extending toward said upper plate;
    (e) a second structure mounted on said upper plate and extending toward said lower plate and along said first structure;
    (f) means defining at least one slot in one of said first and second structures so as to extend toward said lower and upper plates;
    (g) at least one protruding element attached on the other of said first and second structures and extending into said slot, said protruding element being slidably moved along said slot as said lower and upper plates move toward and away from one another; and
    (h) closure means mounted to said one of said first and second structures containing said slot, said closure means defining an end of said slot so as to limit the extent of movement of said protruding element along said slot in a direction in which said plates move away from each other and thereby prevent disassembly of said lower and upper plates from one another, said closure means being releasable and reusable for permitting opening of said slot end for facilitating disassembly of said plates from one another and then reassembly of said plates back together.

2. The top nozzle as recited in claim 1, wherein:
said one of said structures containing said slot has a bore defined therein which intersects with said end of said slot; and
said closure means is a removable and reusable locking pin being mounted in said bore so as to extend across said slot and close said end thereof, said locking pin having flexible means being actuatable for releasing and removing said locking pin from said bore and thereby opening said end of said slot.

3. The top nozzle as recited in claim 2, wherein said locking pin includes:
an elongated body having a cross-sectional size smaller than that of said bore adapting said body to be received through said bore; and
at least one radially flexible locking element extending from said body, said locking element being actuatable between an expanded position for preventing withdrawal of said body from said bore and a collapsed position for allowing withdrawal and reinsertion of said body from and into said bore.

4. The top nozzle as recited in claim 3, wherein said at least one locking element is a plurality of circumferentially spaced radially flexible tangs extending axially from an end of said body.

5. The top nozzle as recited in claim 4, wherein each of said tangs includes:
a radially flexible leg; and
an outer head on said leg having an outer lateral tip being extended beyond the circumference of said bore when said tang is in said expanded position and retracted within said circumference of said bore when said tang is in said collapsed position.

6. The top nozzle as recited in claim 5, wherein said outer head of said tang has a beveled configuration adapting it to cause inward radial flexing of said leg upon contacting said structure for reinsertion of said pin into said bore.

7. The top nozzle as recited in claim 2, wherein said locking pin includes:
   an elongated body having a cross-sectional size smaller than that of said bore adapting said body to be received through said bore;
   an enlarged head attached on one end of said body and having a size larger than that of said bore adapting said head to limit insertion of said body through said bore; and
   a plurality of circumferentially spaced radially flexible tangs extending axially from an opposite end of said body, said tangs being actuatable between an expanded position for preventing withdrawal of said pin from said bore and a collapsed position for allowing withdrawal and reinsertion of said pin from and into said bore.

8. The top nozzle as recited in claim 7, wherein said tangs each include:
   a radially flexible leg; and
   an outer head on said leg having an outer lateral tip being extended beyond the circumference of said bore when said tang is in said expanded position and retracted within said circumference of said bore when said tang is in said collapsed position.

9. The top nozzle as recited in claim 8, wherein said outer head of said tang has a beveled configuration adapting it to cause inward radial flexing of said leg upon contacting said structure for reinsertion of said pin into said bore.

10. In a top nozzle, the combination comprising:
    (a) a lower adapter plate having an upstanding sidewall at least partially surrounding the periphery of said adapter plate, said sidewall including a plurality of slots defined therethrough, said slots being laterally spaced from one another about said sidewall, extending in a direction upwardly away from said adapter plate and terminating in lower and upper ends, said upper slot end being open at an upper edge of said sidewall;
    (b) an upper hold-down plate having a plurality of lugs attached to and extending downwardly from the periphery thereof, each of said lugs being disposed along one of said slots defined in said sidewall and mounting an element which protrudes therefrom and into said respective slot;
    (c) a plurality of hold-down springs extending between said lower adapter plate and upper hold-down plate so as to bias said plates to move away from one another and said elements on said lugs to move along said slots toward said open upper ends thereof, said springs being yieldable so as to permit said plates to be moved toward one another and said elements on said lugs to move along said slots away from said open upper ends thereof; and
    (d) a plurality of reusable locking pins releasably mounted in bores defined in said sidewall so as to extend across said slots therein and close said open upper ends of said slots and thereby prevent movement of said elements out of said slots and disassembly of said plates from each other, said locking pins having radially flexible end tangs being actuatable between expanded positions for preventing withdrawl of said locking pins from said bores and collapsed positions for allowing withdrawl and reinsertion of said locking pins from and into said bores.

11. The top nozzle as recited in claim 10, wherein each of said tangs includes:
    a radially flexible leg; and
    an outer head on said leg having an outer lateral tip being extended beyond the circumference of said bore when said tang is in said expanded position and retracted within said circumference of said bore when said tang is in said collapsed position.

12. The top nozzle as recited in claim 11, wherein said outer head of said tang has a beveled configuration adapting it to cause inward radial flexing of said leg upon contacting said sidewall for reinsertion of said pin into said bore.

13. A method of installing and removing a locking pin into and from a bore defined in a structure of a fuel assembly top nozzle, said locking pin having a plurality of radially flexible tangs axially extending from an end of said pin and capable of being flexed between an expanded position in which outer tips of respective beveled heads on said tangs inscribe a cross-sectional size larger than said bore and a collapsed position in which said tips of said heads inscribe a cross-sectional size smaller than said bore, said method comprising the steps of:
    (a) installing said locking pin in said bore
        (i) engaging said beveled heads on said tangs of said pin with said structure about one end of said bore so as to cause said tangs to flex radially inwardly to said collapsed position, and
        (ii) extending said pin through said bore until said collapsed tangs emerge from an opposite end of said bore whereupon they are free to flex back to said expanded position; and
    (b) removing said locking pin from said bore
        (i) engaging said heads on said tangs of said pin with an end of a tool having a tapered cavity which matches the beveled configuration of said heads,
        (ii) forcibly driving said tool toward said pin so as to cause said tangs to flex from said expanded to collapsed position allowing withdrawal of said pin from said bore, and
        (iii) inserting said tool at least partially into said bore to assist in withdrawing said pin from said bore.

* * * * *